US012602026B2

(12) United States Patent
Takami et al.

(10) Patent No.: US 12,602,026 B2
(45) Date of Patent: *Apr. 14, 2026

(54) CONTROL APPARATUS, CONTROL METHOD, AND STORAGE MEDIUM

(71) Applicant: Yokogawa Electric Corporation, Tokyo (JP)

(72) Inventors: Go Takami, Tokyo (JP); Fumio Nishijo, Tokyo (JP); Satoru Tanaka, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 39 days.

This patent is subject to a terminal disclaimer.

(21) Appl. No.: 18/633,525

(22) Filed: Apr. 12, 2024

(65) Prior Publication Data

US 2024/0255918 A1 Aug. 1, 2024

Related U.S. Application Data

(63) Continuation of application No. 17/223,044, filed on Apr. 6, 2021, now Pat. No. 11,960,267.

(30) Foreign Application Priority Data

Apr. 24, 2020 (JP) ................................. 2020-077843

(51) Int. Cl.
*G05B 19/414* (2006.01)
*B25J 9/16* (2006.01)
(Continued)

(52) U.S. Cl.
CPC .......... *G05B 19/4142* (2013.01); *B25J 9/161* (2013.01); *B25J 9/163* (2013.01); *G05B 13/0265* (2013.01); *G06N 20/00* (2019.01)

(58) Field of Classification Search
CPC ............ G05B 19/4142; G05B 13/0265; G06N 20/00; B25J 9/161; B25J 9/163
(Continued)

(56) References Cited

U.S. PATENT DOCUMENTS 10,668,619 B2 6/2020 Ueda
2008/0200996 A1* 8/2008 Miyamoto ........... G05B 13/045
700/7
(Continued)

FOREIGN PATENT DOCUMENTS

CN 109193075 A 1/2019
EP 1510446 A2 3/2005
(Continued)

OTHER PUBLICATIONS

Extended European Search Report for related European Patent Application No. 20209846.3, issued by the European Patent Office on Apr. 8, 2021.
(Continued)

*Primary Examiner* — Md Azad

(57) ABSTRACT

Provided is a control apparatus including an acquisition unit configured to acquire a measurement value measured regarding control target equipment, a first control unit configured to output an operation amount of the control target equipment according to the measurement value by at least one of feedback control or feed-forward control, a second control unit configured to output an operation amount of the control target equipment according to the measurement value using a model learnt by using learning data, and a switching unit configured to perform switching between the first control unit and the second control unit by which the control target equipment is controlled.

22 Claims, 5 Drawing Sheets

(51) Int. Cl.
    *G05B 13/02*       (2006.01)
    *G06N 20/00*       (2019.01)

(58) Field of Classification Search
    USPC ........................................................... 700/47
    See application file for complete search history.

(56)            References Cited

U.S. PATENT DOCUMENTS

| | | | |
|---|---|---|---|
| 2010/0070098 A1 | 3/2010 | Sterzing | |
| 2017/0285586 A1 | 10/2017 | Bharti | |
| 2018/0164756 A1 | 6/2018 | Yamaguchi | |
| 2018/0181089 A1* | 6/2018 | Fuji | G05B 13/042 |
| 2018/0210406 A1 | 7/2018 | Shimizu | |
| 2018/0284702 A1* | 10/2018 | Sonoda | G05B 13/027 |
| 2018/0335758 A1 | 11/2018 | Shinoda | |
| 2018/0374001 A1* | 12/2018 | Namie | G05B 13/041 |
| 2019/0042919 A1 | 2/2019 | Peysakhovich | |
| 2019/0042979 A1 | 2/2019 | Devulapalli | |
| 2019/0187631 A1 | 6/2019 | Badgwell | |
| 2019/0249727 A1 | 8/2019 | Kurokawa | |
| 2019/0265686 A1 | 8/2019 | Obata | |
| 2019/0294153 A1 | 9/2019 | Yamaguchi | |
| 2020/0026246 A1* | 1/2020 | Nakagawa | G05B 13/0265 |
| 2020/0041160 A1 | 2/2020 | Ko | |
| 2020/0057416 A1 | 2/2020 | Matsubara | |
| 2020/0096955 A1 | 3/2020 | Tsuneki | |
| 2021/0041838 A1 | 2/2021 | Fujii | |
| 2021/0335344 A1 | 10/2021 | Park | |
| 2022/0205666 A1 | 6/2022 | Tan | |

FOREIGN PATENT DOCUMENTS

| | | |
|---|---|---|
| EP | 2924570 A2 | 9/2015 |
| JP | H06105414 A | 4/1994 |
| JP | H07319507 A | 12/1995 |
| JP | H08221379 A | 8/1996 |
| JP | 2000222002 A | 8/2000 |
| JP | 2002258952 A | 9/2002 |
| JP | 2007128318 A | 5/2007 |
| JP | 2009142111 A | 6/2009 |
| JP | 2018097680 A | 6/2018 |
| JP | 2018202564 A | 12/2018 |
| JP | 6536978 B1 | 7/2019 |
| JP | 2019139721 A | 8/2019 |
| JP | 2019145042 A | 8/2019 |
| JP | 2019168973 A | 10/2019 |
| JP | 2020046965 A | 3/2020 |

OTHER PUBLICATIONS

European Office Action issued for related European Patent Application No. 20209846.3, issued by the European Patent Office on Jan. 14, 2022.

Jiasheng Zhang et al, "Structural research of fuzzy PIO controllers", 2005 International Conference on Control and Automation(ICCA2005) Jun. 27-29, 2005, Budapest, Hungary, IEEE vol. 2, Jun. 26, 2005, p. 1248-p. 1253.

Office Action issued for related Japanese Application No. 2019-213293, issued by the Japan Patent Office on May 10, 2022 (drafted on May 2, 2022).

Office Action issued for related Japanese Application No. 2019-213293, issued by the Japanese Patent Office on Oct. 11, 2022 (drafted on Oct. 3, 2022).

Office Action issued for related Japanese Application No. 2019-213293, issued by the Japanese Patent Office on Mar. 14, 2023 (drafted on Mar. 6, 2023).

Extended European Search Report for counterpart European Application No. 21169550.7, issued by the European Patent Office on Sep. 24, 2021.

Office Action issued for counterpart U.S. Appl. No. 17/223,044, issued by the US Patent and Trademark Office on Aug. 4, 2023.

Office Action issued for counterpart Chinese Application 202110440905.0, issued by The State Intellectual Property Office of People's Republic of China on Nov. 6, 2023.

Office Action issued for counterpart Japanese Application No. 2020-077843, transmitted from the Japanese Patent Office on Nov. 21, 2023 (drafted on Nov. 10, 2023).

Office Action issued for related Chinese Application 202011214802.4, issued by The State Intellectual Property Office of People's Republic of China on Sep. 29, 2023.

Those references were submitted as IDS or found by the examiner over the earlier U.S. Appl. No. 17/223,044, filed Apr. 6, 2021.

\* cited by examiner

CONTROL APPARATUS, CONTROL METHOD, AND STORAGE MEDIUM

CROSS-REFERENCE TO RELATED APPLICATIONS

This application is a continuation of U.S. patent application Ser. No. 17/223,044, filed on Apr. 6, 2021, the entire contents of which are explicitly incorporated herein by reference. The application also claims priority from the following Japanese patent application, which is explicitly incorporated herein by reference:

2020-077843 filed in JP on Apr. 24, 2020.

BACKGROUND

1. Technical Field

The present invention relates to a control apparatus, a control method, and a storage medium.

2. Related Art

Up to now, various types of techniques for controlling equipment have been proposed (for example, see Patent document 1). Patent document 1: Japanese Unexamined Patent Application Publication No. 2018-202564

SUMMARY

In order to address the above-mentioned issue, according to a first aspect of the present invention, a control apparatus is provided. The control apparatus may be provided with an acquisition unit configured to acquire a measurement value measured regarding control target equipment. The control apparatus may be provided with a first control unit configured to output an operation amount of the control target equipment according to the measurement value by at least one of feedback control or feed-forward control. The control apparatus may be provided with a second control unit configured to output an operation amount of the control target equipment according to the measurement value using a model learnt by using learning data. The control apparatus may be provided with a switching unit configured to perform switching between the first control unit and the second control unit by which the control target equipment is controlled.

According to a second aspect of the present invention, a control method is provided. The control method may include acquiring a measurement value measured regarding control target equipment. The control method may include outputting an operation amount of the control target equipment according to the measurement value by at least one of feedback control or feed-forward control in a first control phase. The control method may include outputting an operation amount of the control target equipment according to the measurement value using a model learnt by using learning data in a second control phase. The control method may include performing switching between the first control phase and the second control phase by which the control target equipment is controlled.

According to a third aspect of the present invention, a storage medium storing a program is provided. The program may cause a computer to function as an acquisition unit configured to acquire a measurement value measured regarding control target equipment. The program may cause the computer to function as a first control unit configured to output an operation amount of the control target equipment according to the measurement value by at least one of feedback control or feed-forward control. The program may cause the computer to function as a second control unit configured to output an operation amount of the control target equipment according to the measurement value using a model learnt by using learning data. The program may cause the computer to function as a switching unit configured to perform switching between the first control unit and the second control unit by which the control target equipment is controlled.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described by way of embodiments, but the following embodiments are not intended to limit the invention specified in the claims. In addition, not all combinations of features described in the embodiments necessarily have to be essential to solving means of the invention.

1. Configuration of System 1

Figure 1:
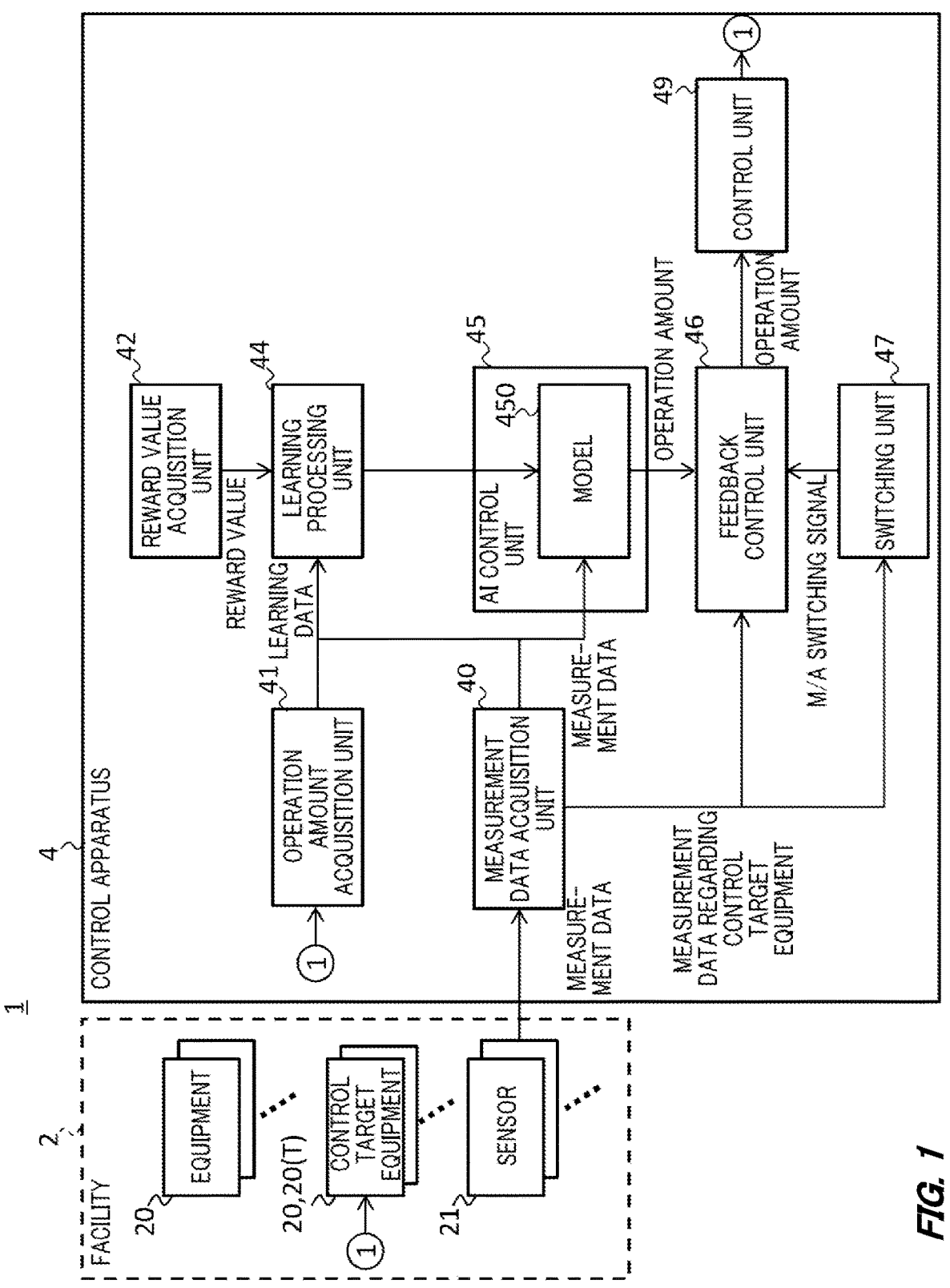
FIG. 1 illustrates a system 1 according to the present embodiment.

FIG. 1 illustrates a system 1 according to the present embodiment. The system 1 according to the present embodiment is provided with a facility 2 and a control apparatus 4.

[1-1. Facility 2]

The facility 2 is constituted by installing a plurality of pieces of equipment 20. For example, the facility 2 may be a plant, or may be a combined apparatus constituted by combining the plurality of pieces of equipment 20 with one another. Examples of the plant include not only an industrial plant such as a chemical or bio plant but also a plant that manages and controls a well source such as a gas field or an oil field and its surrounding area, a plant that manages and controls electric power generation such as hydroelectric, thermal, or nuclear power generation, a plant that manages and controls environmental electric power generation such as solar or wind power generation, a plant that manages and controls water and sewerage or a dam, and the like. According to the present embodiment, as one example, the facility 2 has one or a plurality of pieces of the equipment 20, and one or a plurality of sensors 21.

[1-1-1. Equipment 20]

Each of the equipment 20 is an instrument, machinery, or an apparatus, and may be, for example, an actuator such as a valve, a pump, a heater, a fan, a motor, or a switch configured to control at least one of physical quantities such as a pressure, a temperature, a pH, a speed, or a flow rate in a process of the facility 2.

According to the present embodiment, as one example, the facility 2 is provided with the plurality of pieces of equipment 20. Respective pieces of the equipment 20 may be different types, or at least two or more pieces of the equipment 20 as a part of the equipment 20 may be the same type.

Each of the equipment 20 may be controlled in a wired or wireless manner from the outside via a network which is not illustrated in the drawings, or may be controlled manually. At least a part of the equipment 20 among the plurality of pieces of equipment 20 may be control target equipment 20(T) to be controlled by the control apparatus 4. In a case where the system 1 is provided with a plurality of pieces of the control target equipment 20(T), the plurality of pieces of control target equipment 20(T) may have a relationship of being controlled in conjunction with one another (as one example, a master-slave relationship, or a relationship in which the equipment is not independently controlled). In addition, the respective pieces of control target equipment 20(T) may be the same type of the equipment 20, or may be different types of the equipment 20.

Note that at least a part of the equipment 20 among the plurality of pieces of equipment 20 may be provided with a controller which is not illustrated in the drawings. A state in which the equipment 20 is provided with the controller may include a state in which the controller is built in the equipment 20, and a state in which the controller is externally connected to the equipment 20. According to setting of a target value (set value), the controller may perform feedback control of the equipment 20 so as to reduce a difference between the target value and a current value. The target value of the controller provided in the control target equipment 20(T) may be supplied from the control apparatus 4, and according to the present embodiment, as one example, the target value may be an operation amount of the control target equipment 20(T). The feedback control may be control using at least one of proportional control (P control), integral control (I control), or differential control (D control).

[1-1-2. Sensor 21]

Each of the sensors 21 is configured to measure physical quantities inside and outside the facility 2. Each of the sensors 21 may supply measurement data acquired by the measurement to the control apparatus 4.

According to the present embodiment, as one example, the facility 2 is provided with a plurality of sensors 21. A plurality of pieces of measurement data acquired by the measurement by the plurality of sensors 21 may include at least one of external environment data, feedback control data, operating state data, or consumption amount data.

The external environment data indicates a physical quantity that may affect the control target equipment 20(T) as disturbance. For example, the external environment data may indicate a physical quantity (or a fluctuation thereof) that may affect the control of the control target equipment 20(T) as the disturbance. As one example, the external environment data may indicate a temperature or a humidity of ambient air of the facility 2, sunshine, a wind direction, an air volume, a precipitation, a physical quantity that changes by control of another piece of the equipment 20, or the like. The external environment data may be used to detect the disturbance.

The feedback control data indicates a physical quantity for performing the feedback control of each of the control target equipment 20(T). The feedback control data may indicate a measurement value acquired by the measurement regarding the control target equipment 20(T), and, for example, may indicate an output value by each of the control target equipment 20(T) or may indicate a value that changes by the output value.

The operating state data indicates an operational state as a result of the control of each of the control target equipment 20(T). The operating state data may indicate a physical quantity that may fluctuate by the control of each of the control target equipment 20(T), or may indicate an output value of each of the control target equipment 20(T). The operating state data may be the same as the feedback control data.

The consumption amount data indicates a consumption amount of at least one of energy by the facility 2 or a raw material. The consumption amount data may indicate a consumption amount of electric power or a fuel (LPG as one example) as an energy consumption amount.

[1-3. Control Apparatus 4]

The control apparatus 4 is configured to control each of the control target equipment 20(T). The control apparatus 4 may be one or a plurality of computers, or may be configured by a personal computer (PC) or the like. The control apparatus 4 has a measurement data acquisition unit 40, an operation amount acquisition unit 41, a reward value acquisition unit 42, a learning processing unit 44, an AI control unit 45, a feedback control unit 46, a switching unit 47, and a control unit 49.

[1-3-1. Measurement Data Acquisition Unit 40]

The measurement data acquisition unit 40 is one example of an acquisition unit, and is configured to acquire measurement data measured by the sensor 21. The measurement data acquisition unit 40 may acquire measurement data measured by each of the plurality of sensors 21 provided in the facility 2. The measurement data may include a measurement value measured by each of the control target equipment 20(T).

The measurement data acquisition unit 40 may acquire measurement data indicating an average value of the measurement values in a control cycle of each of the control target equipment 20(T) by the control apparatus 4, or may acquire measurement data indicating a measurement value for every control interval (that is, a measurement value at timing at which the control cycle is ended). According to the present embodiment, as one example, the control cycles of the respective pieces of control target equipment 20(T) may be in synchronization with one another. The measurement data acquisition unit 40 may acquire the measurement data from the sensor 21, or may acquire the measurement data from an operator who has checked the sensor 21. The measurement data acquisition unit 40 may supply the acquired measurement data to the learning processing unit 44 and the AI control unit 45. In addition, the measurement data acquisition unit 40 may supply the measurement value regarding each of the control target equipment 20(T) (according to the present embodiment, as one example, an output value of each of the control target equipment 20(T) or a value that changes by the output value) to the feedback control unit 46 and the switching unit 47.

[1-3-2. Operation Amount Acquisition Unit 41]

The operation amount acquisition unit 41 is configured to acquire an operation amount of each of the control target equipment 20(T). According to the present embodiment, as one example, the operation amount acquisition unit 41 acquires the operation amount from the control unit 49, but may acquire the operation amount from the operator, or may acquire the operation amount from each of the control target equipment 20(T). The operation amount acquisition unit 41 may supply the acquired operation amount to the learning processing unit 44.

[1-3-3. Reward Value Acquisition Unit 42]

The reward value acquisition unit 42 is configured to acquire a reward value used for reinforcement learning in the learning processing unit 44. The reward value may be a value for evaluating an operational state of the facility 2, or may be a value determined by a previously set reward function. Herein, the function is a mapping having a rule in which each element in a certain set corresponds to each element in another set on a one-to-one basis, and may be, for example, a numerical expression, or may be a table.

The reward function may output a reward value acquired by evaluating a state indicated by the measurement data in response to the input of the measurement data. The reward function may be a function by which the reward value becomes higher as the measurement value measured for the control target equipment 20(T) is closer to one target value. The one target value may be a fixed value of the target value regarding the measurement value measured for the control target equipment 20(T), and similarly as in the measurement value, may indicate the output value by each of the control target equipment 20(T), or may indicate the value that changes by the output value. As one example, in a case where the control target equipment 20(T) is a valve and a target value (SV) and a measurement value (PV) indicate an opening of the valve, a reward value R may be indicated by the following reward function.

$$R = 1.0 - |SV - PV| * 0.1$$

The reward function may be set by the operator. The reward value acquisition unit 42 may acquire the reward value from the operator who uses the reward function, or may acquire the reward value by inputting the measurement data from the sensor 21 to the reward function. In a case where the reward value acquisition unit 42 inputs the measurement data to the reward function, the reward function may be stored inside the control apparatus 4, or may be stored outside the control apparatus 4.

[1-3-4. Learning Processing Unit 44]

The learning processing unit 44 is configured to perform learning processing of a model 450 provided in the AI control unit 45. The learning processing unit 44 executes the learning processing of the model 450 using learning data including the measurement data acquired by the measurement data acquisition unit 40 and the operation amount acquired by the operation amount acquisition unit 41. The learning processing unit 44 may execute the learning processing of the model 450 using the reward value from the reward value acquisition unit 42.

[1-3-5. AI Control Unit 45]

The AI control unit 45 is one example of a second control unit, and is configured to output the operation amount of the control target equipment 20(T) according to the measurement value regarding the control target equipment 20(T) by using the model 450 that has been learnt using learning data. The AI control unit 45 may output respective operation amounts of the plurality of pieces of control target equipment 20(T) according to the measurement values regarding the plurality of respective pieces of control target equipment 20(T). The AI control unit 45 may input the operation amount to the feedback control unit 46.

The model 450 may output an operation amount recommended to increase the reward value in response to the input of the measurement data. In a case where a reward value corresponding to the operational state of the facility 2 at a predetermined time instance (as one example, a current moment) is set as a reference reward value (as one example, a reward value acquired by inputting the measurement data at that time instance to the reward function), the operation amount for increasing the reward value may be an operation amount with which the reward value is higher than the reference reward value. In this manner, the operation amount for increasing the reward value is recommended as the control for the control target equipment 20(T) since the operational state is improved as compared with the operational state at the current moment. It is noted however that the reference reward value may be a fixed value (as one example, a value acquired by subtracting an allowable value from a maximum value of the reward value.

Note that according to the present embodiment, as one example, the description is made while the AI control unit 45 has the model 450 built therein, but the model 450 may be stored in a server outside the control apparatus 4 (for example, a cloud server).

[1-3-6. Feedback Control Unit 46]

The feedback control unit 46 is one example of a first control unit, and is configured to output the operation amount of the control target equipment 20(T) according to the measurement value regarding the control target equipment 20(T) by the feedback control. The feedback control unit 46 may output the respective operation amounts of the plurality of pieces of control target equipment 20(T) according to the measurement values regarding the plurality of respective pieces of control target equipment 20(T). The feedback control unit 46 may be operable in an auto mode and a manual mode.

The auto mode is a mode for calculating and outputting, in response to the input of a measurement value, an operation amount of the control target equipment 20(T) according to the measurement value. In the auto mode, the feedback control unit 46 may calculate the operation amount based on the measurement value and the target value to perform the feedback control. The feedback control unit 46 may calculate, in response to the setting of a target value form the operator or external equipment, the operation amount so as to reduce the difference between the target value and the current measurement value. The target value set in the feedback control unit 46 may be a fixed value or may be appropriately altered.

The feedback control unit 46 may perform the feedback control using at least one of the proportional control (P control), the integral control (I control), or the differential control (D control), and according to the present embodiment, as one example, the feedback control unit 46 performs PID control.

The manual mode is a mode for outputting, in response to the input of an operation amount that is to be output, the operation amount. The operation amount input to the feedback control unit 46 may be supplied from the AI control unit 45.

The feedback control unit 46 may supply the operation amount of the control target equipment 20(T) to the control unit 49 in any mode.

[1-3-7. Switching Unit 47]

The switching unit 47 is configured to switch between the feedback control unit 46 and the AI control unit 45 by which the control target equipment 20(T) is controlled (which will be also referred to as control switching).

The switching unit 47 may perform the control switching by switching the mode of the feedback control unit 46. For example, the switching unit 47 may set the feedback control unit 46 in the auto mode to cause the feedback control unit 46 to control each of the control target equipment 20(T). In addition, the switching unit 47 may set the feedback control unit 46 in the manual mode to cause the AI control unit 45 to control each of the control target equipment 20(T).

[1-3-8. Control Unit 49]

The control unit 49 is configured to control each of the control target equipment 20(T) using a supplied operation amount. The control unit 49 may supply an operation amount to each of the control target equipment 20(T) to drive each of the control target equipment 20(T) by the operation amount.

The control unit 49 may control each of the control target equipment 20(T) such that an output value of each of the control target equipment 20(T) is maintained in a control cycle. In a case where the feedback control is performed on the control target equipment 20(T), the control cycle may be longer than a cycle time of the feedback control.

Note that the control unit 49 may further perform control of each unit of the control apparatus 4. For example, the control unit 49 may control the learning of the model 450.

In accordance with the system 1 described above, since the switching is performed between the feedback control unit 46 and the AI control unit 45 by which the control target equipment 20(T) is controlled, in a case where the control is not satisfactorily performed by any one of the feedback control unit 46 and the AI control unit 45, the control can be satisfactorily performed by the other one of the control units. In addition, unlike a case where the control of the control target equipment 20(T) is performed by only the AI control unit 45, a part of the control can be shared with the feedback control unit 46, so that the learning of the model 450 can be simplified.

In addition, since the control switching is performed according to the difference between the measurement value measured for the control target equipment 20(T) and the target value, in a case where the difference is increased during a rising period of the control target equipment 20(T) or a case where the difference is increased by the disturbance or the like, even when it takes time for the feedback control unit 46 to set the measurement value to be close to the target value, the AI control unit 45 can promptly set the measurement value to be close to the target value.

In addition, when the measurement data is input to the model 450 of the AI control unit 45, the operation amount recommended to increase the reward value is output. Therefore, in a case where the control by the AI control unit 45 is performed, the control target equipment 20(T) can be controlled by an appropriate operation amount according to a situation without requiring a trial and error process by a skilled operator.

In addition, the AI control unit 45 inputs the operation amount of the control target equipment 20(T) to the feedback control unit 46, and the switching unit 47 switches the feedback control unit 46 between the auto mode and the manual mode, so that the control switching is performed. Therefore, the control switching can be performed using a mode switching function included in the feedback control unit 46.

2. Operation

[2-1. Learning Phase]

Figure 2:
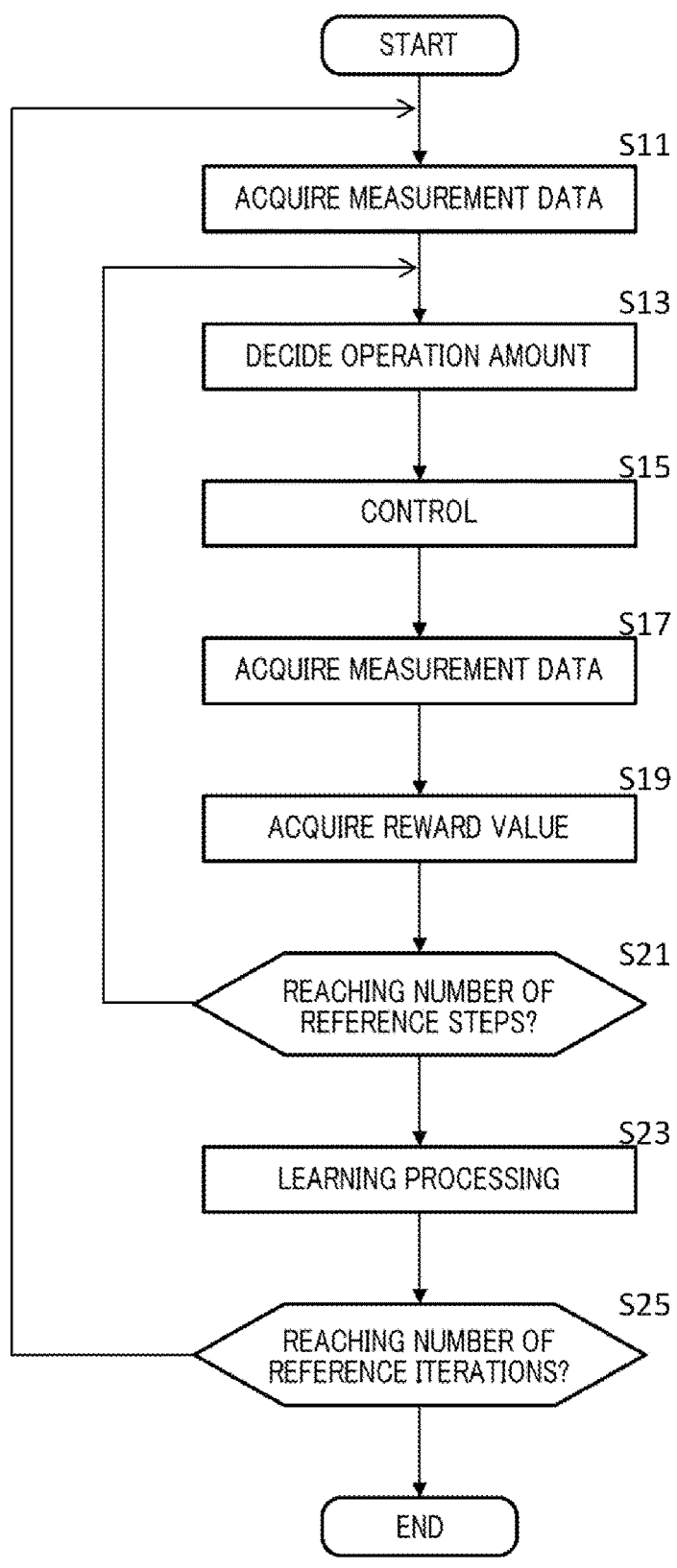
FIG. 2 illustrates an operation in a learning phase of a control apparatus 4 according to the present embodiment.

FIG. 2 illustrates an operation in a learning phase of the control apparatus 4 according to the present embodiment. The control apparatus 4 performs learning of the model 450 by performing processing in steps S11 to S25 while the facility 2 is operated.

First, in step S11, the measurement data acquisition unit 40 acquires measurement data measured by each of the sensors 21. In this manner, the measurement data in an initial state is acquired. The measurement data acquisition unit 40 may store the measurement data in the learning processing unit 44.

In step S13, the control unit 49 decides an operation amount of each of the control target equipment 20(T). The control unit 49 may decide an operation amount in a subsequent control cycle, and according to the present embodiment, as one example, may decide an operation amount to be used in a case where step S15 which will be described is performed next time. The operation amount to be decided may be an operation amount for increasing or decreasing the reward value, or may be an operation amount that is decided irrespective of the reward value.

The control unit 49 may decide the operation amount in the subsequent control cycle in response to an operation by the operator, or may decide an operation amount output from the feedback control unit 46 to which the measurement value regarding each of the control target equipment 20(T) is input, as the operation amount in the subsequent control cycle. Instead of this, the control unit 49 may decide an operation amount output from the model 450 as the operation amount in the subsequent control cycle.

For example, in a case where the processing in step S13 is performed for the first time, the control unit 49 may decide an operation amount output from the model 450 in response to the input of the measurement data acquired in step S11 to the model 450, as the operation amount in the subsequent control cycle. In a case where the processing in step S13 is performed multiple times since the processing in steps S13 to S19 is repeated, the control unit 49 may decide an operation amount output from the model 450 in response to the input of the measurement data acquired in the processing in step S17 that is performed for the last time to the model 450, as the operation amount in the subsequent control cycle. In a case where the processing in step S13 is performed multiple times, different operation amounts may be decided during at least some processing occasions among a plurality of processing occasions in step S13.

In step S15, the control unit 49 outputs the operation amount to each of the control target equipment 20(T) to control each of the control target equipment 20(T). The control unit 49 may store the operation amount in the learning processing unit 44 via the operation amount acquisition unit 41. The control unit 49 may store the operation amount in the learning processing unit 44 in association with the measurement data acquired by the measurement data acquisition unit 40 before the control of each of the control target equipment 20(T). In this manner, the learning data including the measurement data and the operation amount is stored in the learning processing unit 44.

Note that in a case where the processing in step S15 is performed for the first time, the measurement data acquired before the control of the control target equipment 20(T) may be the measurement data acquired in the processing in step S11 described above. In a case where the processing in step S15 is performed multiple times since the processing in steps S13 to S19 is repeated, the measurement data acquired before the control of the control target equipment 20(T) may be the measurement data acquired in the processing in step S17 that is performed for the last time.

In step S17, the measurement data acquisition unit 40 acquires the measurement data measured by each of the sensors 21. In this manner, the measurement data in a case where each of the control target equipment 20(T) is controlled by the operation amount is acquired.

In step S19, the reward value acquisition unit 42 acquires a reward value determined by the reward function. Herein, the measurement data acquired by the measurement data acquisition unit 40 may include both measurement data of a first group and measurement data of a second group, and the measurement data in each group may include at least one type of measurement data. In a case where at least one piece of the measurement data of the first group does not satisfy a reference condition, the reward function may set the reward value as 0 irrespective of respective values of the measurement data of the second group. On the other hand, in a case where each of the measurement data of the first group satisfies the reference condition, the reward function may increase or decrease the reward value according to the respective values of the measurement data of the second group.

The measurement data of the first group may be operating state data, and a reference condition of the measurement data of the first group may be a minimum condition to be achieved by the facility 2. For example, in a case where the facility 2 is a production plant for a product such as a chemical product, the measurement data of the first group may indicate a temperature or a humidity in the plant, and the reference condition of the measurement data may be a temperature range or a humidity range to be maintained for keeping a quality of the product. In addition, the measurement data of the second group may be consumption amount data. In this case, the reward value may be lower as the consumption amount is higher. In this manner, the learning processing is performed so as to reduce the consumption amount.

The reward value acquisition unit 42 may store the acquired reward value in the learning processing unit 44. The reward value acquisition unit 42 may store the reward value in association with the learning data stored in the processing in step S15 which is performed for the last time.

In step S21, the control unit 49 determines whether the processing in steps S13 to S19 is performed the number of times corresponding to the number of reference steps. In a case where it is determined that the processing is not performed the number of times corresponding to the number of reference steps (step S21; No), the processing proceeds to step S13. In this manner, the learning data in which at least one of the measurement data or the operation amount is different is sampled the number of times corresponding to the number of reference steps and stored together with the reward value. Note that in a case where the processing in steps S13 to S19 is repeated, a cycle of step S13 (that is, a control cycle) may be determined according to a time constant of the facility 2, and may be 5 minutes as one example. In step S21, in a case where it is determined that the processing is performed the number of times corresponding to the number of reference steps (step S21; Yes), the processing proceeds to step S23.

In step S23, the learning processing unit 44 performs the learning processing of the model 450 by respectively using sets of the learning data and the reward value stored in association with each other. In this manner, the model 450 is updated. Note that the learning processing unit 44 may perform the learning processing based on a related-art technique such as a steepest descent method, a neural network, deep Q-network (DQN), Gaussian process, or deep learning. The learning processing unit 44 may perform the learning processing of the model 450 such that the operation amount with which the reward value is higher is more preferentially output as the recommended operation amount.

In the model 450 after the learning processing, a weighting factor may be stored in association with the learning data including the measurement data and the operation amount. The weighting factor may be set according to a magnitude of the reward value in a case where the operation amount in the corresponding learning data is used for the control, and may be used for predicting the reward value in a case where the operation amount is used for the control.

In step S25, the control unit 49 determines whether the processing in steps S13 to S23 is performed the number of times corresponding to the number of reference iterations. In a case where it is determined that the processing is not performed the number of times corresponding to the number of reference iterations (step S25; No), the processing proceeds to step S11. In a case where it is determined that the processing is performed the number of times corresponding to the number of reference iterations (step S25; Yes), the processing is ended.

In accordance with the above-mentioned operation, in a case where at least one piece of the measurement data of the first group does not satisfy the reference condition, the reward function sets the reward value as 0 irrespective of the value of each measurement data of the second group, and in a case where each measurement data of the first group satisfies the reference condition, the reward function increases or decreases the reward value according to the value of each measurement data of the second group. Therefore, the learning processing of the model 450 can be performed such that the operation amount with which the reward value is increased on the premise that the measurement data of the first group satisfies the reference condition is preferentially output.

In addition, in a case where the recommended operation amount output from the model 450 is decided as the operation amount in the subsequent control cycle, each of the control target equipment 20(T) is controlled according to the recommended operation amount, and the measurement data according to the control is acquired, so that the learning processing of the model 450 is performed using the learning data including the recommended operation amount and the reward value corresponding to the control result. Therefore, a learning accuracy can be increased by sequentially performing the learning processing of the model 450 in a case where the control is performed based on the recommended operation amount.

[2-2. Running Phase]

Figure 3:
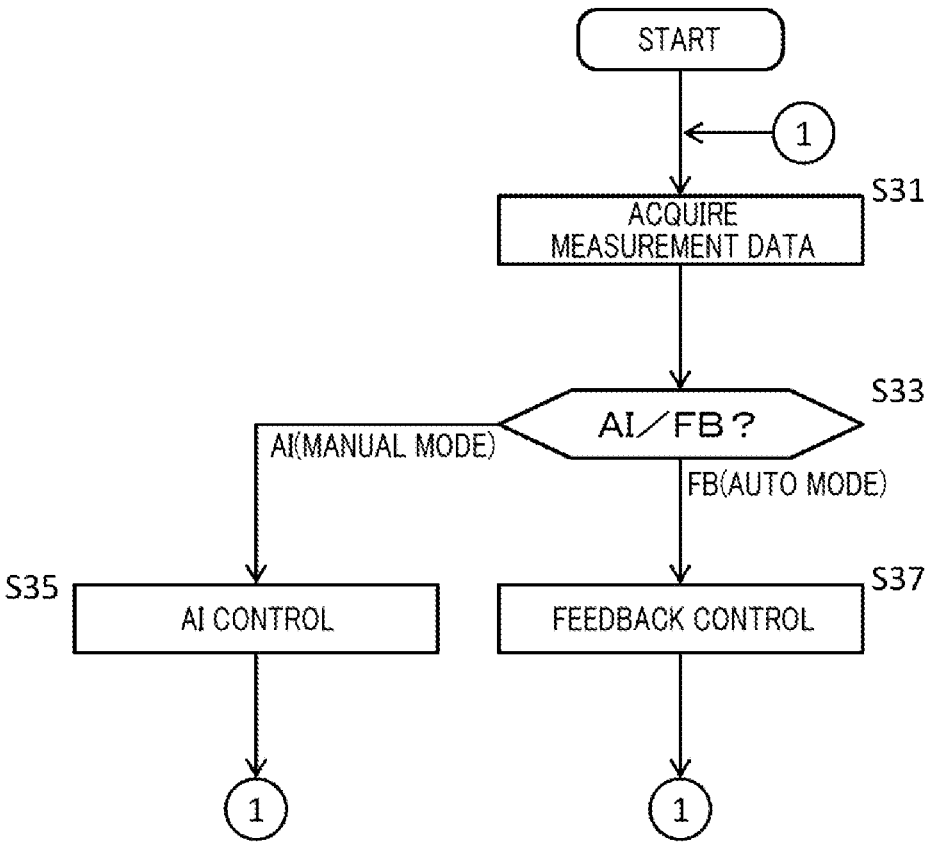
FIG. 3 illustrates an operation in a running phase of the control apparatus 4 according to the present embodiment.

FIG. 3 illustrates an operation in a running phase of the control apparatus 4 according to the present embodiment. The control apparatus 4 performs processing in steps S31 to S37 to operate the facility 2 using the feedback control unit 46 and the AI control unit 45.

In step S31, the measurement data acquisition unit 40 acquires the measurement data measured by each of the sensors 21. In this manner, the measurement data in the initial state is acquired.

In step S33, the switching unit 47 decides between the AI control unit 45 and the feedback control unit 46 by which the control target equipment 20(T) is controlled. In a case where it is decided that the AI control unit 45 is to perform the control (step S33: AI), the switching unit 47 may set the feedback control unit 46 in the manual mode. In this case, the control apparatus 4 may shift the processing to step S35. In a case where it is decided that the feedback control unit 46 is to perform the control (step S33: FB), the switching unit 47 may set the feedback control unit 46 in the auto mode. In this case, the control apparatus 4 may shift the processing to step S37. In a case where it is decided that the feedback control unit 46 is to perform the control from a state where the AI control unit 45 performs the control and a case where it is decided that the AI control unit 45 is to perform the control from a state where the feedback control unit 46 performs the control, the switching unit 47 may perform the control switching (according to the present embodiment, as one example, the switching between the manual mode and the auto mode of the feedback control unit 46).

The switching unit 47 may perform the control switching according to a difference between the measurement value and the target value regarding the control target equipment 20(T). As one example, the switching unit 47 may perform the control switching from the control by the feedback control unit 46 to the control by the AI control unit 45 in response to a state where the difference between the measurement value and the target value is higher than a reference value, and may perform the control switching from the control by the AI control unit 45 to the control by the feedback control unit 46 in response to a state where the difference is lower than the reference value. The switching unit 47 may give hysteresis characteristics to the reference value in a case where the switching is performed to the control by the AI control unit 45 and the reference value in a case where the switching is performed to the control by the feedback control unit 46, and may set the latter reference value to be lower than the former reference value. The switching unit 47 may acquire the target value from the feedback control unit 46.

In addition, in response to a state occurring multiple times where the difference between the measurement value and the target value regarding the control target equipment 20(T) is higher than the reference value within a reference time window, that is, a state occurring multiple times where the difference is changed from a value equal to or lower than the reference value to a value higher than the reference value, the switching unit 47 may perform the control switching from the control by the feedback control unit 46 to the control by the AI control unit 45. As one example, the switching unit 47 may perform the control switching to the control by the AI control unit 45 in response to the occurrence of hunting where the measurement value fluctuates due to the disturbance or the like. Any time width may be used as the reference time window, and any value may be used as the reference value.

In this case, in response to a state where the difference between the measurement value and the target value is maintained to be lower than the reference value within the reference time window, the switching unit 47 may perform the switching from the control by the AI control unit 45 to the control by the feedback control unit 46. The switching unit 47 may give hysteresis characteristics to the reference value in a case where the switching is performed to the control by the AI control unit 45 and the reference value in a case where the switching is performed to the control by the feedback control unit 46, and may set the latter reference value to be lower than the former reference value.

In addition, the switching unit 47 may perform the control switching based on a comparison result between a threshold and the measurement value regarding the control target equipment 20(T). The threshold may be set based on one target value regarding the control target equipment 20(T) included in the reward function. For example, the threshold may be a value acquired by performing operations such as arithmetic operations on one target value, or may be one target value itself.

In a case where the control switching is performed on the basis of the comparison result between the threshold and the measurement value, the switching unit 47 may decide that the AI control unit 45 is to control the control target equipment 20(T) when the measurement value is equal to or lower than the threshold. On the other hand, when the measurement value is higher than the threshold, the switching unit 47 may decide that the feedback control unit 46 is to control the control target equipment 20(T). As one example, in a case where the control target equipment 20(T) is a valve and one target value indicating an opening is 30%, the threshold may be set as 30% corresponding to the one target value itself. In a case where the measurement value is equal to or lower than 30%, the AI control unit 45 may control the valve of the control target equipment 20(T), and in a case where the measurement value is higher than 30%, the feedback control unit 46 may control the valve.

The switching unit 47 may give hysteresis characteristics to the threshold in a case where the switching is performed to the control by the AI control unit 45 and the threshold in a case where the switching is performed to the control by the feedback control unit 46, and may set the latter threshold to be higher than the former threshold.

In step S35, the control apparatus 4 performs the control of the control target equipment 20(T) based on the AI control unit 45. For example, the model 450 of the AI control unit 45 may output the operation amount recommended in response to the supply of the measurement data from the measurement data acquisition unit 40, to the control unit 49 via the feedback control unit 46. The control unit 49 may supply the input operation amount to the control target equipment 20(T). In this manner, the control target equipment 20(T) is driven by the operation amount. When the processing in step S35 is ended, the control apparatus 4 may shift the processing to step S31.

Note that in step S35, with regard to each operation amount included in the learning data, the model 450 may calculate a reward value predicted in a case where the operation amount is used for the control (which will be also referred to as a predicted reward value). For example, the model 450 may extract respective pieces of learning data including one operation amount from a plurality of pieces of learning data. The model 450 may set, as the predicted reward value regarding the one operation amount, a result acquired by weighting addition of respective weighting factors associated with the respective pieces of extracted learning data according to a distance between the measurement data indicating a state at the current moment (according to the present embodiment, as one example, the measurement data acquired by the processing in step S31 that is performed for the last time) and the measurement data in the learning data. The model 450 may set a magnitude of weighting such that the weighting is decreased as the distance between the measurement data is longer (that is, in a manner that an influence on the reward value is reduced). The model 450 may more preferentially set the operation amount with which the predicted reward value is higher as the recommended operation amount. It is noted however that the model 450 does not necessarily need to set the operation amount with which the predicted reward value is the highest as the recommended operation amount.

In step S37, the control apparatus 4 performs the control of the control target equipment 20(T) by the feedback control unit 46. For example, the feedback control unit 46 may output the operation amount according to the measurement value to the control unit 49 in response to the input of the measurement value regarding the control target equipment 20(T). The control unit 49 may supply the input operation amount to the control target equipment 20(T). In this manner, the control target equipment 20(T) is driven by the operation amount. When the processing in step S37 is ended, the control apparatus 4 may shift the processing to step S31.

In step S37, in a case where the switching from the manual mode to the auto mode is performed, the feedback control unit 46 controls the operation amount before and after the switching in a bumpless manner, that is, suppresses abrupt change of the operation amount before and after the switching. For example, the feedback control unit 46 may calculate the subsequent operation amount using an integral term back-calculated from the operation amount output in the manual mode (that is, the operation amount supplied from the AI control unit 45). As one example, the feedback control unit 46 may calculate an operation amount MV from the following Expressions (1) and (2) in a case where the PID control is performed in the auto mode. In a case where the feedback control unit 46 is switched from the manual mode to the auto mode, the subsequent operation amount MV may be calculated by back-calculating an integral term in the second term on the right-hand side of Expression (2) from the operation amount output in the manual mode.

[Math. 1]

$$\Delta v_i = PV_i - SV_i \tag{1}$$

$$MV = P * \Delta v_i + I * \sum_{i=1}^{n} \Delta v_i + D * (\Delta v_i - \Delta v_{i-1}) \tag{2}$$

Where suffixes i and i−1 in the expression are variables indicating control timing. PV is a measurement value with regard to the control target equipment 20(T), and is, in other words, process data. SV is a target value, and is, in other words, a set value. P, I, and D are a proportional gain, an integral gain, and a differential gain.

In accordance with the operation described above, in response to a state occurring multiple times in which the difference between the measurement value and the target value is higher than the reference value within the reference time window, the control switching from the control by the feedback control unit 46 to the control by the AI control unit 45 is performed. Therefore, in a case where the hunting occurs due to the control by the feedback control unit 46, the measurement value can be set to be close to the target value by suppressing the hunting.

In addition, the reward value is higher as the measurement value is closer to one target value in the reward function used in the AI control unit 45, and the control switching is performed on the basis of the comparison result between the threshold based on the one target value and the measurement value. Therefore, in a case where the measurement value is included in a range where the control is not satisfactorily performed by the AI control unit 45, the control can be satisfactorily performed by the feedback control unit 46.

In addition, since the threshold in a case where the switching to the control by the AI control unit 45 is performed and the threshold in a case where the switching to the control by the feedback control unit 46 is performed have the hysteresis characteristics, it is possible to avoid a situation where the operation amount is unstable while a control main body is frequently switched by the fluctuation of the measurement value.

In addition, in a case where the feedback control unit 46 is switched from the manual mode to the auto mode, since the operation amount before and after the switching is controlled in a bumpless manner, discontinuity between the operation amount output from the feedback control unit 46 in the manual mode and the operation amount newly calculated by the feedback control unit 46 in the auto mode can be suppressed, and the fluctuation can be suppressed.

3. Application Example

Figure 4:
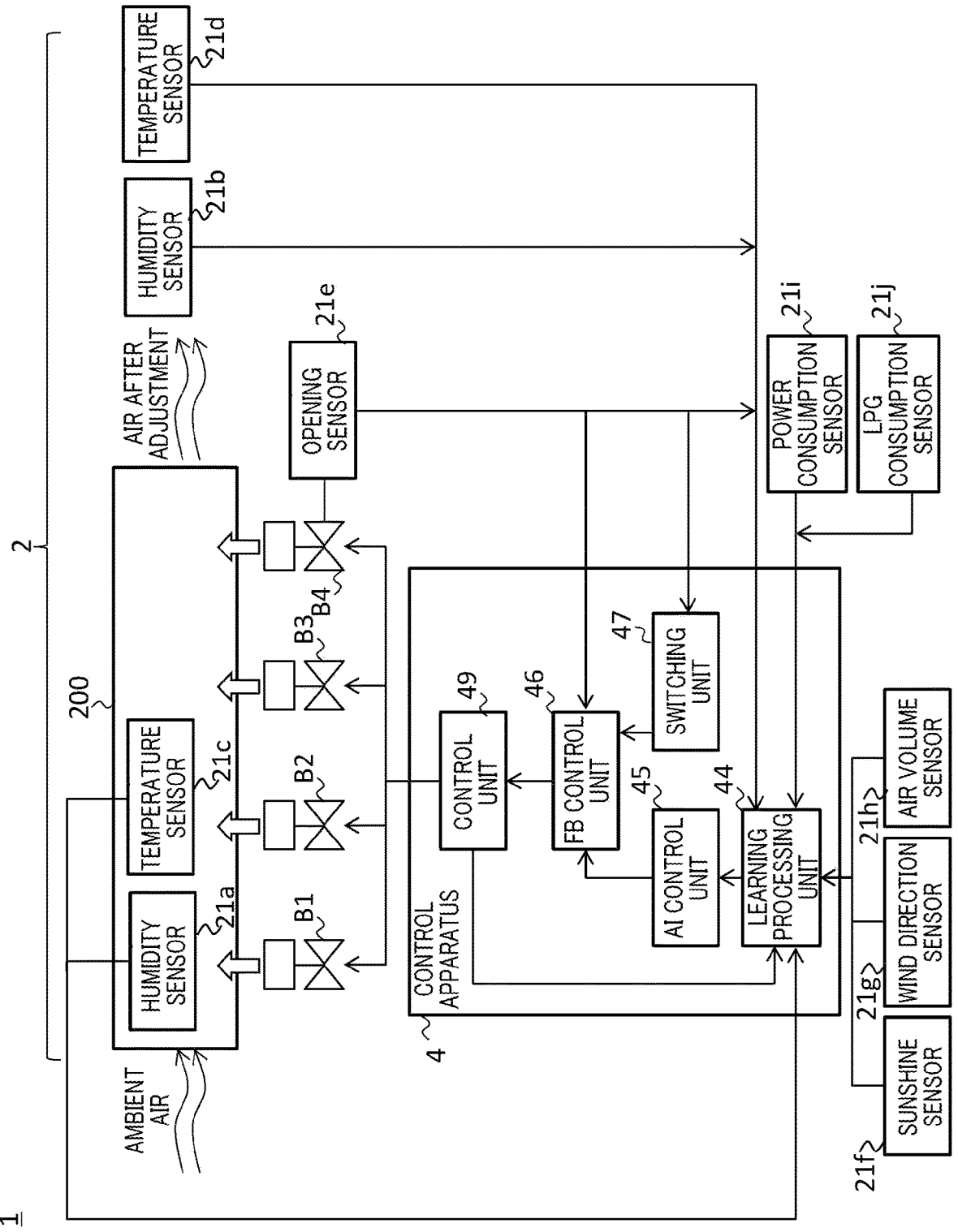
FIG. 4 illustrates an application example of the system 1.

FIG. 4 illustrates an application example of the system 1. Note that in FIG. 4, a configuration of the control apparatus 4 is simplified for the illustration.

In the present application example, the facility 2 is an air conditioner for plants and is configured to take ambient air into a duct 200 and supply air after a temperature and a humidity are adjusted to a room in a plant or another air conditioner.

Valves B1 to B4 serving as the control target equipment 20(T) are installed in the facility 2. The valve B1 is configured to adjust a heating amount in the duct 200, the valve B2 is configured to adjust a cooling amount in the duct 200, the valve B3 is configured to adjust a humidifying amount in the duct 200, and the valve B4 is configured to adjust a dehumidifying amount in the duct 200.

In addition, humidity sensors 21a and 21b, temperature sensors 21c and 21d, an opening sensor 21e, a sunshine sensor 21f, a wind direction sensor 21g, an air volume sensor 21h, a power consumption sensor 21i, an LPG consumption sensor 21j, and the like serving as the sensors 21 are installed in the facility 2. The humidity sensor 21a and the temperature sensor 21c measure a humidity and a temperature of the ambient air taken into the duct 200. The humidity sensor 21b and the temperature sensor 21d measure a humidity and a temperature of the air discharged from the duct 200 after the adjustment. The opening sensor 21e measures respective openings (output values) of the valves B1 to B4. The sunshine sensor 21f, the wind direction sensor 21g, and the air volume sensor 21h measure a sunshine amount, a wind direction, and an air volume outside the plant in which the facility 2 is installed. The power consumption sensor 21i measures a power consumption amount of the facility 2. The LPG consumption sensor 21j measures an LPG consumption amount of the facility 2.

The learning processing unit 44 of the control apparatus 4 executes the learning processing of the model 450 in the AI control unit 45 using the learning data including the measurement data measured by these sensors 21a to 21j and the operation amounts of the respective valves B1 to B4. In the present application example, as one example, the operation amounts are related to the openings corresponding to the output values of the valves B1 to B4. When the operation amounts related to the openings are transmitted from the control apparatus 4 using electric signals or the like, the valves B1 to B4 open and close by the operation amounts. The reward value used in the learning processing may be set as 0 in a case where at least one of the temperature or the humidity of the air after the adjustment is not maintained in a reference range, and the reward value may be set as a higher value as the power consumption amount and the LPG consumption amount are lower in a case where both the temperature and the humidity of the air after the adjustment are maintained in the reference ranges.

The AI control unit 45 calculates the recommended operation amount for increasing the reward value in response to the input of the measurement data measured by the sensors 21*a* to 21*j*.

The feedback control unit 46 calculates the operation amount based on the opening measured by the opening sensor 21*e* and a target value of the opening.

The switching unit 47 performs the control switching according to a difference between the opening measured by the opening sensor 21*e* and the target value of the opening. The switching unit 47 switches the feedback control unit 46 between the manual mode and the auto mode to cause the control unit 49 to supply any one of the operation amount calculated by the AI control unit 45 and the operation amount calculated by the feedback control unit 46 from the feedback control unit 46.

The control unit 49 supplies the operation amounts to the valves B1 to B4 to cause the valves B1 to B4 to open and close by the operation amounts.

5. Modified Example

Note that according to the above-mentioned embodiment, the description has been made while the system 1 is provided with the single control apparatus 4, but the system 1 may be provided with a plurality of the control apparatuses 4. In this case, the control target equipment 20(T) may be the same or may be different among the respective control apparatuses 4. As one example, for each of the equipment 20, the control apparatus 4 in which the equipment 20 is set as the control target equipment 20(T) may be installed in the system 1.

In addition, the description has been made while the control apparatus 4 has the operation amount acquisition unit 41, the reward value acquisition unit 42, the learning processing unit 44, and the control unit 49, but a configuration may be adopted where the control apparatus 4 does not have at least one of these units. In a case where the control apparatus 4 does not have the learning processing unit 44 or the operation amount acquisition unit 41, the control apparatus 4 may control, without performing the learning processing of the model 450, the control target equipment 20(T) using the model 450 where the learning processing has already been performed.

In addition, the description has been made while the measurement data acquisition unit 40 acquires the measurement data measured by each of the plurality of the sensors 21, but the measurement data acquisition unit 40 may acquire only the measurement value regarding the control target equipment 20(T).

In addition, the description has been made while the switching unit 47 performs the control switching according to the difference between the measurement value regarding the control target equipment 20(T) and the target value, but the switching unit 47 may perform the control switching according to elapsed time from the start of the control on the control target equipment 20(T). For example, the switching unit 47 may cause the AI control unit 45 to perform the control until reference time elapses from the start of the control on the control target equipment 20(T), and may cause the feedback control unit 46 to perform the control after the reference time has elapsed. In this manner, overshoot or undershoot in a rising period of the control target equipment 20(T) can be avoided, and the measurement value can be promptly set to be close to the target value. In addition, the control by the feedback control unit 46 is performed after the reference time has elapsed from the start of the control on the control target equipment 20(T), so that the measurement value can be stably controlled. Timing at the start of the control on the control target equipment 20(T) may be timing at which the control by the control apparatus 4 is started when the control target equipment 20(T) and the control apparatus 4 are activated, or timing at which, once the control is started, thereafter, the control by the control apparatus 4 is newly started when the target value set in the control apparatus 4 is changed. As one example, in a case where the control target equipment 20(T) is controlled by the feedback control unit 46, the reference time may be a period until the overshoot or the undershoot recedes from the start of the control.

In addition, the description has been made while the control apparatus 4 has the feedback control unit 46 configured to output the operation amount according to the measurement value by the feedback control, but the control apparatus 4 may have a control unit configured to output an operation amount according to a measurement value by feed-forward control in addition to the feedback control or instead of the feedback control.

In addition, the description has been made while the control apparatus 4 has the single feedback control unit 46, but the control apparatus 4 may have a plurality of the feedback control units 46. The plurality of these feedback control unit 46 may be connected in a multistage arrangement to perform cascade control in which the feedback control processes are combined in a multiplexing manner. The measurement value regarding the same control target equipment 20(T) may be input to the feedback control unit 46 in each stage, and the operation amount output from the feedback control unit 46 in a preceding stage may be input to the feedback control unit 46 in the following stage as the target value. In this case, the AI control unit 45 may supply the operation amount to any one of the feedback control units 46, and the mode of the feedback control unit 46 may be switched between the manual mode and the auto mode by the switching unit 47. In addition, in a case where the feedback control units 46 are connect in a multistage arrangement, the control apparatus 4 may have a plurality of the AI control units 45. The plurality of these AI control units 45 may respectively supply the operation amounts to the different feedback control units 46, and the respective modes of these feedback control unit 46 may be switched between the manual mode and the auto mode by the switching unit 47. The same learning processing may be applied or different types of learning processing may be applied to the models 450 of the plurality of AI control units 45.

In addition, the description has been made while the switching unit 47 performs the control switching by switching the mode of the feedback control unit 46, but the control switching may be performed by another technique. For example, the AI control unit 45 and the feedback control unit 46 may respectively supply the calculated operation amounts to the switching unit 47, and the switching unit 47 may perform the switching control by switching between the AI control unit 45 and the feedback control unit 46 as the supply source of the operation amount to be output to the control unit 49.

In addition, various embodiments of the present invention may be described with reference to flowcharts and block diagrams, whose blocks may represent (1) steps of processes in which operations are performed or (2) units of apparatuses responsible for performing operations. Certain steps and units may be implemented by at least any one of dedicated circuitry, programmable circuitry supplied with computer-readable instructions stored on computer-readable media, or processors supplied with computer-readable instructions stored on computer-readable media. Dedicated circuitry may include at least one of digital or analog hardware circuits and may include at least one of integrated circuits (IC) or discrete circuits. Programmable circuitry may include reconfigurable hardware circuits including logical AND, OR, XOR, NAND, NOR, and other logical operations, flip-flops, registers, memory elements such as field-programmable gate arrays (FPGA) and programmable logic arrays (PLA), and the like.

Computer-readable media may include any tangible device that can store instructions for execution by a suitable device, such that the computer-readable medium having instructions stored therein is provided with an article of manufacture including instructions which may be executed to create means for performing operations specified in the flowcharts or block diagrams. Examples of computer-readable media may include an electronic storage medium, a magnetic storage medium, an optical storage medium, an electromagnetic storage medium, a semiconductor storage medium, and the like. More specific examples of computer-readable media may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), and C++, and conventional procedural programming languages, such as the "C" programming language or similar programming languages.

Computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of processors include computer processors, processing units, microprocessors, digital signal processors, controllers, microcontrollers, and the like.

Figure 5:
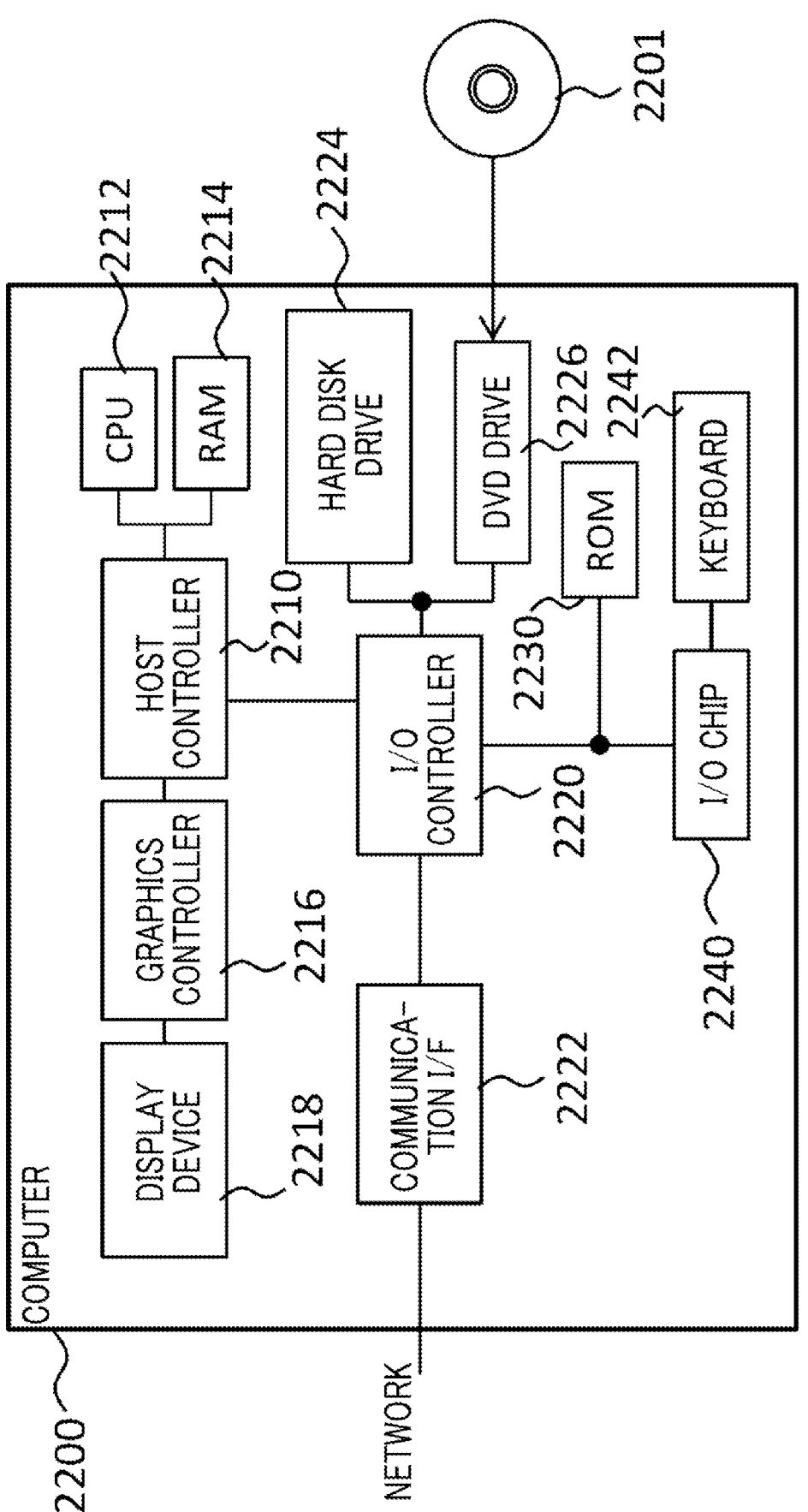
FIG. 5 illustrates an example of a computer 2200 in which a plurality of aspects of the present invention may be entirely or partially embodied.

FIG. 5 illustrates an example of a computer 2200 in which a plurality of aspects of the present invention may be entirely or partially embodied. A program that is installed in the computer 2200 can cause the computer 2200 to function as or perform operations associated with apparatuses according to the embodiments of the present invention or one or more units thereof, and in addition to this, or instead of this, cause the computer 2200 to perform processes of the embodiments of the present invention or steps thereof. Such a program may be executed by a CPU 2212 to cause the computer 2200 to perform certain operations associated with some or all of the blocks of flowcharts and block diagrams described herein.

The computer 2200 according to the present embodiment includes the CPU 2212, a RAM 2214, a graphics controller 2216, and a display device 2218, which are mutually connected by a host controller 2210. The computer 2200 also includes input and output units such as a communication interface 2222, a hard disk drive 2224, a DVD-ROM drive 2226, and an IC card drive, which are connected to the host controller 2210 via an input and output controller 2220. The computer also includes legacy input and output units such as a ROM 2230 and a keyboard 2242, which are connected to the input and output controller 2220 through an input and output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and in addition to this, or instead of this, writes programs and data into the IC card.

The ROM 2230 stores therein at least one of a boot program or the like executed by the computer 2200 at the time of activation, or a program depending on the hardware of the computer 2200. The input and output chip 2240 may connect various input and output units via a parallel port, a serial port, a keyboard port, a mouse port, and the like to the input and output controller 2220.

A program is provided by computer-readable media such as the DVD-ROM 2201 or the IC card. The program is read from the computer-readable media, installed into the hard disk drive 2224, RAM 2214, or ROM 2230, which are also examples of computer-readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording media.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, or the like, and perform various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may perform various types of processing on the data read from the RAM 2214, including various types of operations, processing of information, condition judging, conditional branch, unconditional branch, search or replace of information, and the like, as described throughout this disclosure and designated by an instruction sequence of programs, and writes the result back to the RAM 2214. In addition, the CPU 2212 may search for information in a file, a database, or the like, in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer-readable media on the computer 2200 or near the computer 2200. In addition, a recording medium such as a hard disk or a RAM provided in a server system connected to a dedicated communication network or the Internet can be used as the computer-readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-mentioned embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1 system, 2 facility, 4 control apparatus, 20 equipment, 21 sensor, 40 measurement data acquisition unit, 41 operation amount acquisition unit, 42 reward value acquisition unit, 44 learning processing unit, 45 AI control unit, 46 feedback control unit, 47 switching unit, 49 control unit, 200 duct, 450 model, 2200 computer, 2201 DVD-ROM, 2210 host controller, 2212 CPU, 2214 RAM, 2216 graphics controller, 2218 display device, 2220 input and output controller, 2222 communication interface, 2224 hard disk drive, 2226 DVD-ROM drive, 2230 ROM, 2240 input and output chip, 2242 keyboard.

What is claimed is:

1. A control apparatus comprising:

an acquisition unit configured to acquire a measurement value measured regarding control target equipment;

a first control unit configured to output an operation amount of the control target equipment according to the measurement value by at least one of feedback control or feed-forward control;

a second control unit configured to output an operation amount of the control target equipment according to the measurement value using a model learnt by using learning data; and a switching unit configured to perform switching between the first control unit and the second control unit by which the control target equipment is controlled, wherein the switching unit is configured to perform the switching from a control by the first control unit to a control by the second control unit according to a difference between the measurement value and a target value.

2. The control apparatus according to claim 1, wherein the switching unit is configured to perform the switching from the control by the first control unit to the control by the second control unit in response to a state occurring multiple times where the difference between the measurement value and the target value is higher than a reference value within a reference time window.

3. The control apparatus according to claim 1, wherein:

the first control unit is configured to output an operation amount calculated based on the measurement value and a target value; and the model of the second control unit is learnt by using learning data that includes measurement data including the measurement value and the operation amount of the control target equipment, and is configured to output a recommended operation amount of the control target equipment for increasing a reward value determined by a previously set reward function in response to input of the measurement data.

4. The control apparatus according to claim 3, wherein:

the reward function is a function by which the reward value is increased as the measurement value gets closer to the target value; and the switching unit is configured to perform the switching on the basis of a comparison result between a threshold based on the target value and the measurement value.

5. The control apparatus according to claim 4, wherein the switching unit is configured to set a threshold used for switching from the control by the second control unit to the control by the first control unit to be higher than a threshold used for switching from the control by the first control unit to the control by the second control unit.

6. The control apparatus according to claim 1, wherein the switching unit is configured to cause the second control unit to perform the control until reference time elapses from start of the control on the control target equipment, and the first control unit to perform the control after the reference time has elapsed from the start of the control on the control target equipment.

7. The control apparatus according to claim 1, wherein the first control unit is configured to perform feedback control using at least one of proportional control, integral control, or differential control.

8. The control apparatus according to claim 1, wherein:

the first control unit is operable in an auto mode for calculating and outputting, in response to input of the measurement value, an operation amount of the control target equipment according to the measurement value, and a manual mode for outputting, in response to input of the operation amount that is to be output, the operation amount;

the second control unit is configured to input the operation amount of the control target equipment to the first control unit; and the switching unit is configured to perform the switching by switching a mode of the first control unit.

9. The control apparatus according to claim 8, wherein in a case where the switching from the manual mode to the auto mode is performed, the first control unit is configured to control the operation amount before and after the switching such that an abrupt change of the operation amount before and after the switching is suppressed.

10. A control apparatus comprising:

an acquisition unit configured to acquire a measurement value measured regarding control target equipment;

a first control unit configured to output an operation amount of the control target equipment according to the measurement value by at least one of feedback control or feed-forward control;

a second control unit configured to output an operation amount of the control target equipment according to the measurement value using a model learnt by using learning data; and a switching unit configured to perform switching between the first control unit and the second control unit by which the control target equipment is controlled, wherein the switching unit is configured to perform the switching from a control by the second control unit to a control by the first control unit in response to a fact that a difference between the measurement value and a target value becomes smaller than a reference value.

11. The control apparatus according to claim 10, wherein the switching unit is configured to perform the switching from the control by the first control unit to the control by the second control unit in response to a state occurring multiple times where the difference between the measurement value and the target value is higher than a reference value within a reference time window.

12. The control apparatus according to claim 10, wherein:

the first control unit is configured to output an operation amount calculated based on the measurement value and a target value; and the model of the second control unit is learnt by using learning data that includes measurement data including the measurement value and the operation amount of the control target equipment, and is configured to output a recommended operation amount of the control target equipment for increasing a reward value determined by a previously set reward function in response to input of the measurement data.

13. The control apparatus according to claim 12, wherein:

the reward function is a function by which the reward value is increased as the measurement value gets closer to the target value; and the switching unit is configured to perform the switching on the basis of a comparison result between a threshold based on the target value and the measurement value.

14. The control apparatus according to claim 13, wherein the switching unit is configured to set a threshold used for switching from the control by the second control unit to the control by the first control unit to be higher than a threshold used for switching from the control by the first control unit to the control by the second control unit.

15. The control apparatus according to claim 10, wherein the switching unit is configured to cause the second control unit to perform the control until reference time elapses from start of the control on the control target equipment, and the first control unit to perform the control after the reference time has elapsed from the start of the control on the control target equipment.

16. The control apparatus according to claim 10, wherein the first control unit is configured to perform feedback control using at least one of proportional control, integral control, or differential control.

17. The control apparatus according to claim 10, wherein:

the first control unit is operable in an auto mode for calculating and outputting, in response to input of the measurement value, an operation amount of the control target equipment according to the measurement value, and a manual mode for outputting, in response to input of the operation amount that is to be output, the operation amount;

the second control unit is configured to input the operation amount of the control target equipment to the first control unit; and the switching unit is configured to perform the switching by switching a mode of the first control unit.

18. The control apparatus according to claim 17, wherein in a case where the switching from the manual mode to the auto mode is performed, the first control unit is configured to control the operation amount before and after the switching such that an abrupt change of the operation amount before and after the switching is suppressed.

19. A control method comprising:

acquiring a measurement value measured regarding control target equipment;

outputting an operation amount of the control target equipment according to the measurement value by at least one of feedback control or feed-forward control in a first control phase;

outputting an operation amount of the control target equipment according to the measurement value using a model learnt by using learning data in a second control phase; and performing switching between the first control phase and the second control phase by which the control target equipment is controlled, wherein the performing switching includes performing the switching from a control in the first control phase to a control in the second control phase according to a difference between the measurement value and a target value.

20. A non-transitory computer-readable storage medium storing a control program for causing a computer to function as:

an acquisition unit configured to acquire a measurement value measured regarding control target equipment;

a first control unit configured to output an operation amount of the control target equipment according to the measurement value by at least one of feedback control or feed-forward control;

a second control unit configured to output an operation amount of the control target equipment according to the measurement value using a model learnt by using learning data; and a switching unit configured to perform switching between the first control unit and the second control unit by which the control target equipment is controlled, wherein the switching unit is configured to perform the switching from a control by the first control unit to a control by the second control unit according to a difference between the measurement value and a target value.

21. A control method comprising:

acquiring a measurement value measured regarding control target equipment;

outputting an operation amount of the control target equipment according to the measurement value by at least one of feedback control or feed-forward control in a first control phase;

outputting an operation amount of the control target equipment according to the measurement value using a model learnt by using learning data in a second control phase; and performing switching between the first control phase and the second control phase by which the control target equipment is controlled, wherein the performing switching includes performing the switching from a control in the second control phase to a control in the first control phase in response to a fact that a difference between the measurement value and a target value becomes smaller than a reference value.

22. A non-transitory computer-readable storage medium storing a control program for causing a computer to function as:

an acquisition unit configured to acquire a measurement value measured regarding control target equipment;

a first control unit configured to output an operation amount of the control target equipment according to the measurement value by at least one of feedback control or feed-forward control;

a second control unit configured to output an operation amount of the control target equipment according to the measurement value using a model learnt by using learning data; and a switching unit configured to perform switching between the first control unit and the second control unit by which the control target equipment is controlled, wherein the switching unit is configured to perform the switching from a control by the second control unit to a control by the first control unit in response to a fact that a difference between the measurement value and a target value becomes smaller than a reference value.

* * * * *